(12) United States Patent
Basak et al.

(10) Patent No.: US 11,645,320 B2
(45) Date of Patent: May 9, 2023

(54) WORKLOAD IDENTIFICATION

(71) Applicant: NetApp, Inc., Sunnyvale, CA (US)

(72) Inventors: Jayanta Basak, Bangalore (IN);
Kushal Wadhwani, Bangalore (IN);
Kaladhar Voruganti, Sunnyvale, CA (US)

(73) Assignee: NETAPP, INC., San Jose, CA (US)

( * ) Notice: Subject to any disclaimer, the term of this patent is extended or adjusted under 35 U.S.C. 154(b) by 261 days.

(21) Appl. No.: 15/715,952

(22) Filed: Sep. 26, 2017

(65) Prior Publication Data
US 2018/0018339 A1      Jan. 18, 2018

Related U.S. Application Data

(63) Continuation of application No. 13/781,619, filed on Feb. 28, 2013, now Pat. No. 10,534,805.

(51) Int. Cl.
| | | |
|---|---|---|
| *G06F 16/35* | (2019.01) | |
| *G06F 16/21* | (2019.01) | |
| *G06F 11/34* | (2006.01) | |

(52) U.S. Cl.
CPC ........ *G06F 16/355* (2019.01); *G06F 11/3414* (2013.01); *G06F 16/217* (2019.01); *G06F 11/3409* (2013.01); *G06F 11/3419* (2013.01); *G06F 2201/83* (2013.01)

(58) Field of Classification Search
CPC .................................................. G06F 16/355
USPC ....................................................... 707/737
See application file for complete search history.

(56) References Cited

U.S. PATENT DOCUMENTS

| | | | | |
|---|---|---|---|---|
| 6,396,492 B1 * | 5/2002 | Frisken | ................... | G06T 17/00 |
| | | | | 345/420 |
| 6,483,518 B1 * | 11/2002 | Perry | .................... | G06T 11/206 |
| | | | | 345/590 |
| 8,250,581 B1 | 8/2012 | Blanding | | |
| 8,312,460 B1 | 11/2012 | Blanding | | |

(Continued)

OTHER PUBLICATIONS

Debnath B.K. et al., "SARD: A Statistical Approach for Ranking Database Tuning Parameters," Data Engineering Workshop, 2008, ICDEW 2008, IEEE 24th International Conference on, IEEE, Piscataway, NJ, USA, Apr. 7, 2008 (Apr. 7, 2008), pp. 11-18,XP031246594, ISBN: 978-1-4244-2161-9.

(Continued)

*Primary Examiner* — Muluemebet Gurmu
(74) *Attorney, Agent, or Firm* — Troutman Pepper Hamilton Sanders LLP (NetApp)

(57) ABSTRACT

An embodiment of the invention provides an apparatus and method for classifying a workload of a computing entity. In an embodiment, the computing entity samples a plurality of values for a plurality of parameters of the workload. Based on the plurality of values of each parameter, the computing entity determines a parameter from the plurality of parameters that the computing entity's response time is dependent on. Here, the computing entity's response time is indicative of a time required by the computing entity to respond to a service request from the workload. Further, based on the identified significant parameter, the computing entity classifies the workload of the computing entity by selecting a workload classification from a plurality of predefined workload classifications.

17 Claims, 8 Drawing Sheets

(56) References Cited

U.S. PATENT DOCUMENTS

| | | | | |
|---|---|---|---|---|
| 8,903,995 | B1* | 12/2014 | Basak | H04L 43/08 709/224 |
| 2002/0183994 | A1* | 12/2002 | Fuse | G02B 5/1847 703/6 |
| 2004/0225631 | A1 | 11/2004 | Elnaffar et al. | |
| 2004/0263840 | A1* | 12/2004 | Segall | G01B 11/02 356/243.1 |
| 2005/0203930 | A1* | 9/2005 | Bukowski | G06F 16/29 |
| 2007/0213967 | A1* | 9/2007 | Park | G03F 7/705 703/13 |
| 2008/0022284 | A1 | 1/2008 | Cherkasova et al. | |
| 2008/0262823 | A1* | 10/2008 | Oslake et al. | G06F 9/46 718/105 |
| 2009/0070623 | A1 | 3/2009 | Sciacca | |
| 2009/0083737 | A1* | 3/2009 | Ben-Yehuda et al. | G06F 9/45 703/22 |
| 2009/0183016 | A1 | 7/2009 | Chan et al. | |
| 2009/0235268 | A1 | 9/2009 | Seidman et al. | |
| 2009/0271662 | A1 | 10/2009 | Tarta | |
| 2011/0145554 | A1 | 6/2011 | Struik | |
| 2012/0046775 | A1* | 2/2012 | Chien et al. | G06F 19/00 700/104 |
| 2013/0085980 | A1* | 4/2013 | Alemi | G06N 5/022 706/50 |
| 2013/0097109 | A1* | 4/2013 | Arndt et al. | G06N 5/02 706/46 |
| 2017/0024452 | A1* | 1/2017 | Budalakoti | G06F 16/24556 |

OTHER PUBLICATIONS

Elnaffar S., et al., "Characterizing Computer Systems' Workloads," Innovations in Information Technology, 2006, Dec. 31, 2002, (Dec. 31, 2002), XP055303996, PI ISBN: 978-1-4244-0673-9, Retrieved from the Internet: URL: http://research.cs.queensu.ca/TechReports/Reports/2002-461.pdf [retrieved on Sep. 20, 2016].

International Search Report and Written Opinion for Application No. PCT/US2014/013034 dated May 29, 2014, 10 pages.

Narayanan D., et al., "Continuous Resource Monitoring for Self-Predicting DBMS," Modeling, Analysis, and Simulation of Computer and Telecommunication Systems, 2005, 13th IEEE International Symposium, Atlanta, GA, USA Sep. 27-29, 2005, Piscataway, NJ, USA, IEEE, Sep. 27, 2005 (Sep. 27, 2005), pp. 239-248, XP010843600, DOI: 10.1109/MASCOTS. 2005.21, ISBN: 978-0-7695-2458-0.

Supplementary European Search Report for Application No. EP14757585 dated Sep. 30, 2016, 13 pages.

Yoo R.M., et al., "Hierarchical Means: Single Number Benchmarking with Workload Cluster Analysis," IEEE 10th International Symposium on Workload Characterization, 2007, pp. 204-213.

European Patent Office Communication and Examination Report for European Patent Application No. 14757585.6 -1222 dated Apr. 5, 2018.

* cited by examiner

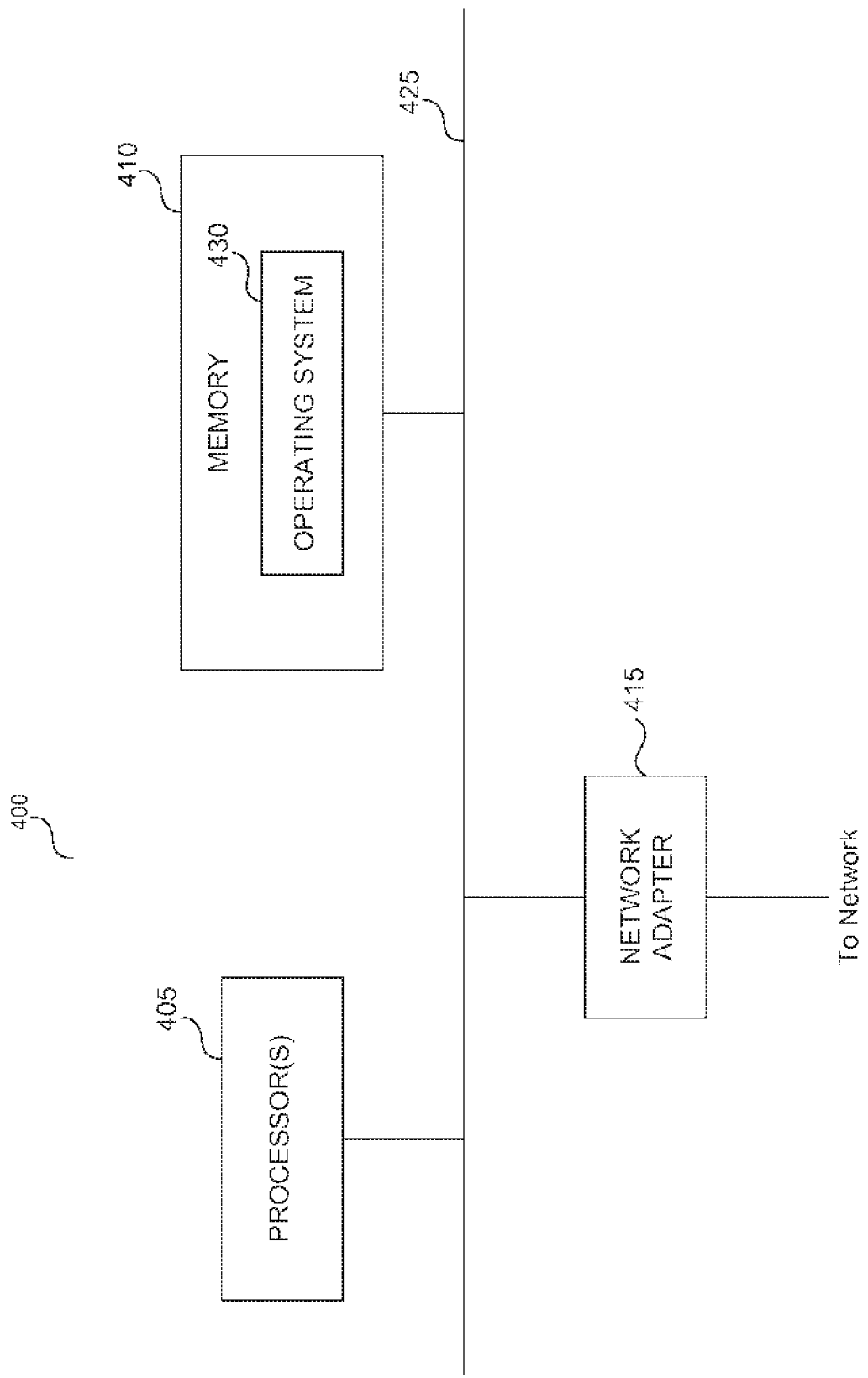

WORKLOAD IDENTIFICATION

This application is a continuation, of prior U.S. patent application Ser. No. 13/781,619, filed Feb. 28, 2013, which is herein incorporated by reference.

TECHNICAL FIELD

At least one embodiment of the present invention pertains to a computing entity, and more particularly, to the field of classifying a workload of a computing entity.

BACKGROUND

The type of workload managed by a computing entity, such as database management system, is a key consideration in tuning the computing entity. For example, allocation for resources, such as main memory, can vary significantly depending on whether the workload type is Online Transaction Processing (OLTP) or Decision Support System (DSS). It would be preferable for administrators of the computing entity, such as database administrators, to recognize significant shifts in workload types that would require reconfiguring the computing entity or co-locating similar workloads to maintain acceptable levels of performance.

Currently, the identification of a workload's type is performed by a person by pre-classifying a given workload into one of a plurality of predefined classes, for example, "test", "web server", "database", where each of the classes identifies an expected load pattern and/or behavior. However, increasingly, human detection of workload type is becoming more difficult as the complexity of workloads increase. The increased workload complexity causes detection of workload patterns that are used to determine workload types to become more difficult. Accordingly, current workload identification technology is limited in its capabilities and suffers from at least the above constraints and deficiencies.

Introduced herein is a workload type classifier, used by a machine-implemented computing entity, to recognize workload types so that the computing entity may then manage or adjust its performance and reconfigure its resources accordingly.

The technique introduced here provides an apparatus and method for classifying a workload of a computing entity. In one embodiment, the computing entity samples a plurality of values for a plurality of parameters of the workload. Based on the plurality of values of each parameter, the computing entity determines a significant parameter from the plurality of parameters upon which the computing entity's response time is dependent on. The computing entity's response time is indicative of a time required by the computing entity to respond to a service request from the workload. Further, based on the identified significant parameter, the computing entity classifies the workload of the computing entity by selecting a workload classification from a plurality of predefined workload classifications. The computing entity may then utilize the determined classification of the workload to manage or adjust its performance and reconfigure its resources according to the resource needs of a typical workload that falls into the determined classification.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 4 is a high-level block diagram showing an example of the architecture for a system in which the workload classification technique can be implemented.

Figure 1:
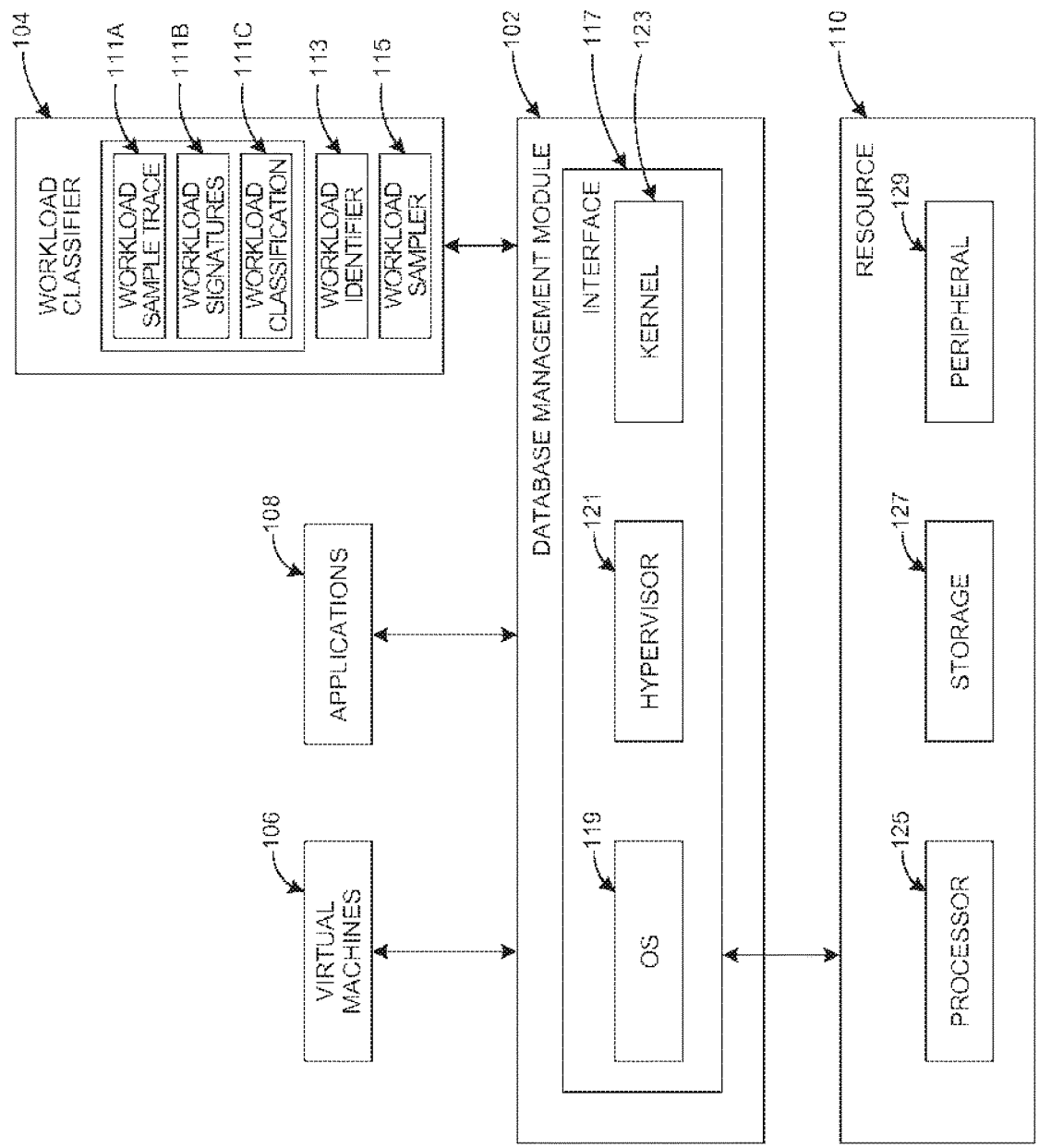
FIG. 1 is a schematic block diagram illustration of a system in which the workload classifier can be implemented.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable medium including, but not limited to, an application specific integrated circuit (ASIC), compact disc (CD), digital video disk (DVD), read only memory (ROM), floppy disk, hard disk, electrically erasable programmable read only memory (EEPROM), memory stick, flash memory device or any other non-volatile memory device, or any other storage device, in accordance with the claimed subject matter.

Although embodiments of the invention are not limited in this regard, the term "Virtual Machine" (VM) as used herein may include one or more environments able to emulate, simulate, virtualize, execute, directly execute, run, implement, or invoke a hardware component, a software component, an Operating System (OS), an application, a code, a set of instructions, or the like. The VM may be implemented using hardware components and/or software components. In one example, the VM is implemented as a software application executed by a processor, or as a hardware component integrated within a processor.

Although embodiments of the invention are not limited in this regard, the term "software service" as used herein may include an environment, program, application, process, procedure, function, object, and/or task capable of using one or more resources. In one example, the software service may include a VM. In another example, the software service may include an application, a program, and/or an application program, which may be associated with an OS, or an OS kernel.

Although embodiments of the invention are not limited in this regard, the term "resource" as used herein may include any suitable device, apparatus, article, unit, system, subsystem, module, component, and/or medium to be used by a software service. The resource may be implemented as a physical hardware resource, e.g., using any suitable mechanical, magnetic, electrical, or electronic device, module, unit, component or system; as a virtualized hardware resource, e.g., using any suitable virtualization method; and/or as a software resource.

System Environment:

FIG. 1 schematically illustrates a system 100 in accordance with an embodiment. In some embodiments, system 100 includes at least one database management system ("DBMS") 102 associated with at least one resource 110 via an interface 117, e.g., as described in detail below. Resource 110 may include, for example, at least one processor 125, at least one storage device 127, e.g., a disk, one or more peripherals 129, and/or any other physical hardware resource, virtualized hardware resource, software resource, and the like.

In one embodiment, DBMS 102 hosts a virtual machine 106, which may include, for example, a guest OS, a workload classifier 104, and/or one or more guest applications 108, where each hosted application represents a workload of the DBMS 102. Further, in some embodiments, the DBMS includes an interface 117 which may in turn include a hypervisor 121. In one example, hypervisor 121 runs on processor 125, and hosts one or more virtual machines, e.g., virtual machines 106. Hypervisor 121 may also selectively serve requests of virtual machines 106 to utilize resource 110, e.g., storage 127, and/or peripherals 129. In another embodiment, the interface 117 of the database management module 102 includes an OS 119, and/or a kernel 123. OS 119 and/or kernel 123 may run on processor 125, and may manage one or more applications, e.g., including application 108. OS 119 and/or kernel 123 may also selectively serve requests of application 108 to utilize resource 110, e.g., storage 127, and/or peripherals 129.

In some embodiments, the workload classifier 104 of system 100 gathers information associated with the other workloads, e.g., application 108, currently being hosted on the system 100 (i.e. the runtime workload), using a workload data sampler 115. In some embodiments, based on the gathered information, the workload classifier 104 further determines a workload signature for each of the runtime workloads and classifies the runtime workloads according to their workload signature as described in detail below. The gathered information associated with the runtime workloads may include information exchanged between DBMS 102 and the interface 117 on behalf of the workloads. In some embodiments, workload data sampler 115 performs any suitable sampling operations including, for example, continuous monitoring, periodical monitoring, random monitoring, and/or pseudo-random monitoring. In one embodiment, workload data sampler 115 and workload classifier 104 are implemented as separate modules of system 100. In another embodiment, workload data sampler 115 and workload classifier 104 are commonly implemented by a single module of system 100.

The information gathered by the workload data sampler 115 may include, for example, information relating to requests from the runtime workloads for resource allocations, responses to the requests for resource allocations, actual usage of resources by the workloads, network traffic to/from the DBMS 102, one or more indications of a state of operation of the DBMS 102, and/or any other suitable information. When gathering information associated with the runtime workloads, the workload data sampler 115 may not affect the operation of the DBMS 102, may not require assistance from the DBMS 102, may not require the DBMS 102 to be aware of the monitoring, and/or may not require adapting, modifying or altering the DBMS 102. In one embodiment, workload data sampler 115 and interface 117 are implemented as separate elements of system 100. In one embodiment, the workload data sampler 115 is implemented as part of interface 117, e.g., as part of hypervisor 121.

In some embodiments, the workload data sampler 115 performs data sampling of at least one parameter related to a workload of DBMS 102. Although embodiments of the invention are not limited in this respect, in some embodiments the monitored parameter includes, for example, a parameter relating to a network activity performed by DBMS 102, a parameter related to storage channel communications performed by DBMS 102, a parameter related to resource utilization by DBMS 102, a parameter related to requests by DBMS 102 to utilize resource 110, and/or any other suitable detectable parameter related to operations performed by DBMS 102 for the workload with respect to resource 110.

In some embodiments, the workload classifier 104 includes a database of workload classifications 111c that correspond to a plurality of different workload types, respectively. Further, the workload classifier 104 may also include a plurality of predefined workload signatures 111b that correspond to the plurality of workload classifications 111c, respectively. In some embodiments, a workload signature corresponding to a given workload classification 111c includes one or more parameters of the plurality of parameters sampled by the workload data sampler 115 when, for example, the DBMS 102 is subject to a workload trace corresponding to the given workload classification. In one instance, the one or more parameters included in the workload signature are significant for predicting the response time of DBMS 102 for responding to any service requests from the workload trace. Additional details on how the workload signature is generated are described in detail with reference to FIGS. 2A-2C and FIGS. 3A-3C.

In some embodiments, the workload classifier 104 is capable of determining one or more workload classifications 111c and/or workload signatures 111b offline by performing a workload classification definition process, as described in detail below. However, embodiments of the invention are not limited in this respect, and in some embodiments one or more of workload classifications 111c and/or workload signatures 111b may be received by workload classifier 104, e.g., from one or more elements of 100, and/or from one or more other systems, e.g., via a communication connection or network.

In some embodiments, the workload classifier 104 determines the workload signatures 111b offline by applying the plurality of workload sample traces 111a to DBMS 102 during a plurality of learning periods, respectively. Each learning period can last for at least thirty seconds. A workload signature of signatures 111b can be determined by the workload classifier 104 by sampling a plurality of values for each of a plurality of parameters of a corresponding workload sample trace 111a.

In some embodiments, based on the sampled values of the plurality of parameters, the workload classifier 104 identifies one or more parameters of the plurality of parameters which are significant for predicting the response time of DBMS 102 for responding to any service requests from the workload sample trace 111a. The workload classifier 104 then stores the identified one or more parameters as the workload signature, where the stored workload signature corresponds to a workload classification that includes workloads of type similar to the workload sample trace 111a used to generate the workload signature. Additional details on how the workload signature is generated for a given workload are described in detail with reference to FIGS. 2A-2C and FIGS. 3A-3C.

In some embodiments, the workload classifier 104 determines the workload signature of runtime workloads that are currently being hosted by the DBMS 102. For example, workload classifier 104 can determine the workload signature of a runtime workload by sampling a plurality of values for a plurality of parameters of the runtime workload. In some embodiments, based on the sampled values of the plurality of parameters, the workload classifier 104 identifies one or more parameters of the plurality of parameters which are significant for predicting the response time of DBMS 102 for responding to any service requests from the runtime workload. The workload classifier 104 then stores the identified one or more parameters as a candidate workload signature of the runtime workload.

In some embodiments, the workload classifier 104 classifies the runtime workload of DBMS 102 by selecting a workload classification from workload classifications 111c based on a comparison between the candidate workload signature and workload signatures 111b. For example, the workload classifier 104 can perform approximate matching of the candidate workload signature against the stored workload signatures 111b and choose a workload classification for the runtime workload as the classification that corresponds to a workload signature of signatures 111b with the best match with the candidate workload signature. The best match between the runtime workload signature and workload signatures 111b can be determined using any suitable match recognition method and/or algorithm, for example, a nearest neighbor matching algorithm and/or any other matching algorithm.

For example, the workload classifier 104 can perform an approximate matching of the candidate workload signature against the stored workload signatures 111b. The workload classifier 104 can determine a matching score for each of the stored workload signatures 111b corresponding to the candidate workload signature and choose a workload signature of the workload signatures 111b with the highest matching score as the workload signature of the runtime workload. Additional details on how the workload signature is generated and later used to classify a given runtime workload are described in detail with reference to FIGS. 2A-2C and FIGS. 3A-3C.

Figure 2A:
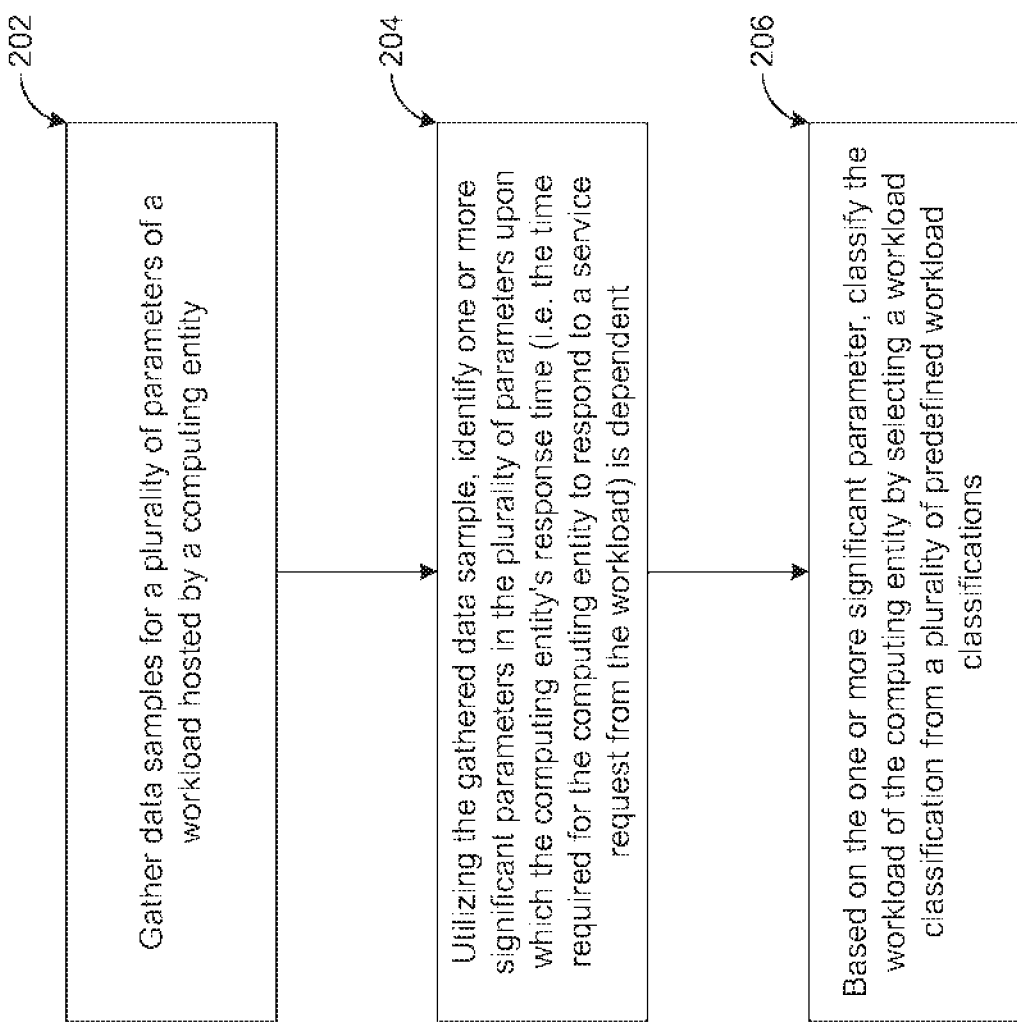
FIG. 2A is a schematic flow-chart illustration of a method of classifying a workload of a system.

FIG. 2A illustrates a method of determining a workload signature of a workload of DBMS 102 in accordance with some embodiments. Although embodiments of the invention are not limited in this respect, according to some embodiments, one or more operations of the method of FIG. 2A can be implemented by a system, e.g., system 100, a DBMS, e.g., DBMS 102, a workload classifier 104, e.g., workload classifier 104, etc., to determine a workload signature of a workload. The workload signature can include a workload signature to be determined during a runtime period of a workload, and/or a predefined workload signature, e.g., of workload signatures 111b, to be determined during a learning period.

Data Sampling Workload Parameters

In block 202, the method includes performing data sampling of a plurality of parameters of a workload. In one example, the workload data sampler 115 of the workload classifier 104 performs data sampling of a plurality of parameters of a workload during one or more learning periods in which DBMS 102 hosts one or more workload sample traces 111a as described above. In another example, the workload data sampler 115 performs data sampling of a plurality of parameters of a runtime workload during a runtime period as described above.

In some embodiments, the workload data sampler 115 continuously monitors the DBMS 102 and captures different general parameter values of the workload. In some embodiments, the workload data sampler 115 gathers the average values of the different general parameters of the workload in certain regular intervals, e.g., 10 sec. In some embodiments, the group of general parameters of the workload measured at one instance of time, e.g., 10 sec, is treated as one sample of data of the workload. In some embodiments, the workload data sampler 115 gathers a large number of samples (e.g., 2000 samples) over a period of time before proceeding to block 204.

In some embodiments, the different general parameter values gathered by the workload data sampler 115 could include the total number of requests (i.e. system operation requests) carried out by workload, the average response time (i.e. latency) of the DBMS 102 in responding to the requests, the total number of read operations carried out by workload, the read latency associated with each carried out read request, the size of read data associated with each read operation, the total number of write operations carried out by workload, the write latency associated with each carried out write request, the size of data writes associated with each carried out write operation, the total number of other operations carried out by workload that are neither read or write requests, and the latency associated with each carried out other operations.

In some embodiments, the workload data sampler 115 derives various workload parameters of the workload from the gathered data samples of the above described general parameters. For each gathered data sample, the derived workload parameters could include percentage of read operations carried out by the workload within the time period (e.g., 10 sec) the sample was measured ("read percentage"), percentage of write operations carried out by the workload within the sample's time period ("write percentage"), percentage of other operations carried out by the workload within the sample's time period ("other percentage"), the average size of data read by the various read operation within the sample's time period ("read 10 size"), the average size of data written by the various write operation within the sample's time period ("write 10 size"), the percentage of random read operations (i.e. operations with read 10 size smaller than a certain minimum threshold, e.g., 16 KB) carried out by the workload within the sample's time period ("random read percentage"), the percentage of random write operations (i.e. operations with write 10 size smaller than a certain minimum threshold, e.g., 16 KB)

carried out by the workload within the sample's time period ("random write percentage"), etc. It should be noted here that, in some embodiments, the workload parameters can also be directly measured by the workload data sampler 115 from the DBMS 102 and in that case, it may be unnecessary to capture these general parameter values of the workload.

In block 202, the method gathers the data samples of the various workload parameters of the workload and provides the gathered data samples of the various workload parameters to block 204 for determining the workload signature of the workload. In some embodiments, the data provided by block 202 includes the average latency, one of the gathered general parameters, of each data sample along with the workload parameters of the data samples.

In block 204, the method includes identifying one or more parameters of the received workload parameters on which the DBMS's 102 response time (i.e. latency) for responding to the service requests from the workload is dependent on. The service requests from the workload could include 10 requests such as read data, write date, etc. In other words, the method includes identifying one or more specific parameters of the received workload parameters which are important for predicting the latency of the DBMS's 102 when responding to the service requests from the workload. In one example, the workload identifier 113 performs identifying one or more parameters of the received workload parameters on which the DBMS's 102 response time is dependent on.

Figure 2B:
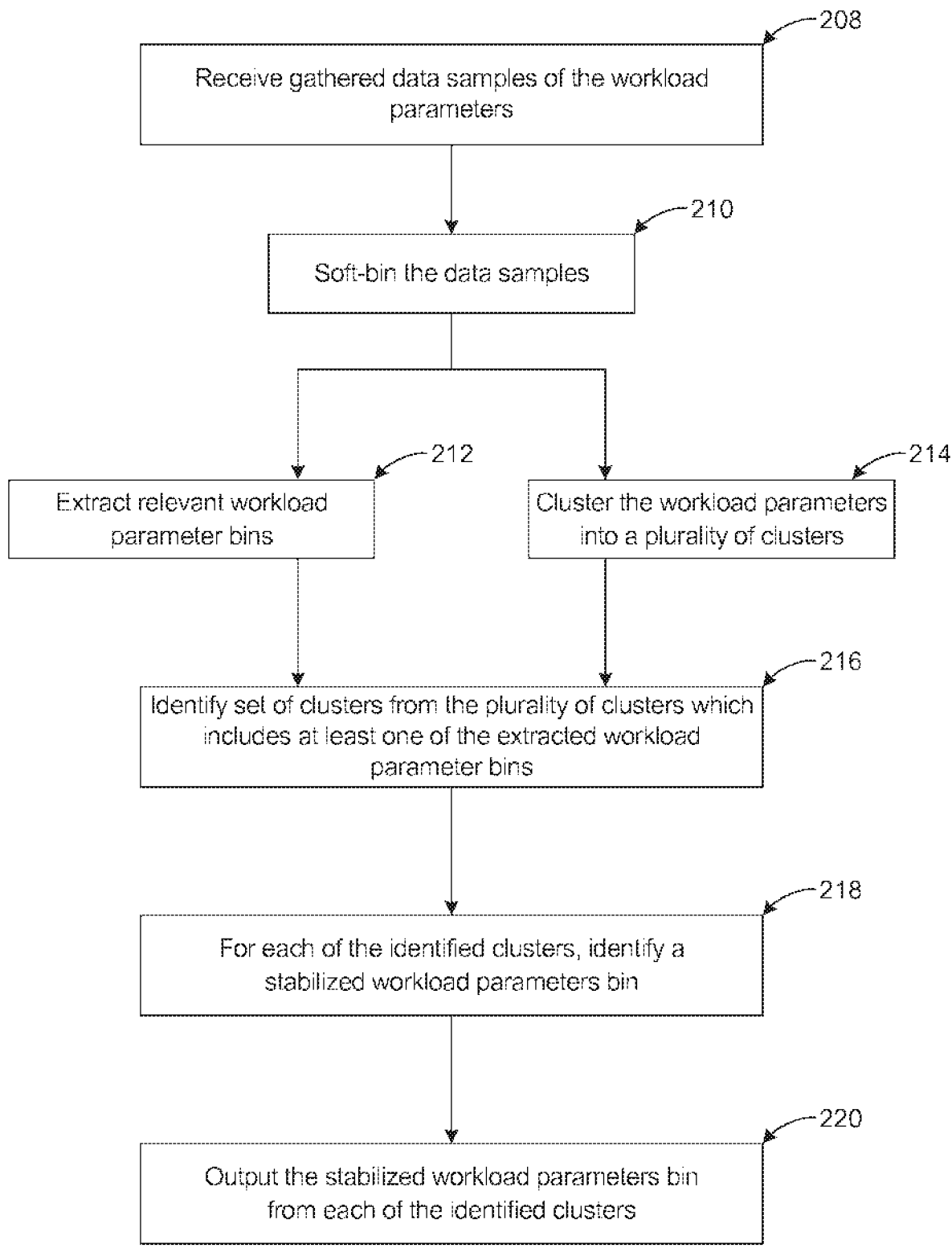
FIG. 2B is a schematic flow-chart illustration of a method of determining one or more significant parameters of a workload.

In some embodiments, the workload identifier 113 identifies one or more parameters of the received workload parameters which are important for predicting the latency of the DBMS's 102 utilizing the method disclosed in FIG. 2B. In block 210 of the method disclosed in FIG. 2B, the workload identifier 113 bins the data samples of the workload parameters received in block 208 into smaller bins before determining the specific parameters that are important for predicting the latency (i.e. response time) of the DBMS 102.

Soft-Binning Workload Parameters

In some embodiments, the sampled workload parameters received by the workload identifier 113 includes seven different workload parameters apart from the average latency (i.e. the general parameter) as described above. The different workload parameters includes the read percentage, write percentage, other percentage, read 10 size, write 10 size, random read percentage, and random write percentage. In some embodiments, the workload identifier 113 splits each of the workload parameters into multiple bins, where each bin represents a possible data range of the workload parameter. In some embodiments, the workload identifier 113 utilizes these granular bins of each workload parameter and identifies the one or more of the granular bins that are important for predicting the latency of the DBMS's 102.

In some embodiments, the workload identifier 113 represents each data sample as a 64-bit binary vector, where each bit in the vector represents a predefined data range (i.e. a granular bin as described above) of one of the received workload parameters. In some embodiments, each bit of a given data sample corresponds to a granular bin and the workload identifier 113 identifies the one or more of the granular bins of the various workload parameters that are important for predicting the latency of the DBMS's 102.

In some embodiments, the workload parameters read percentage, write percentage, other percentage, random read percentage and random write percentage can each be split into 10 different bins of various percentage ranges, say 0-10%, 10-20%, 20-30%, . . . , 90-100%, and be represented by a corresponding bit in the 64-bit binary vector of the data sample. Similarly, the workload parameters read 10 size and write 10 size can each be split into 7 different bins of various data ranges, say 0-2 KB, 2-4 KB, 4-8 KB, 8-16 KB, 16-32 KB, 32-64 KB, and >64 KB, and be represented by a corresponding bit in the 64-bit binary vector of the data sample.

Figure 3A:
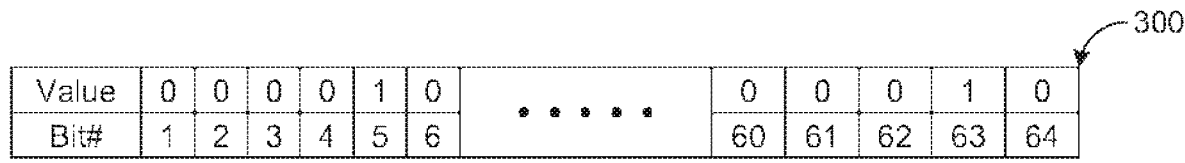
FIG. 3A provides an example of a 64-bit vector of a data sample gathered from a workload of a system.
Figure 3A:
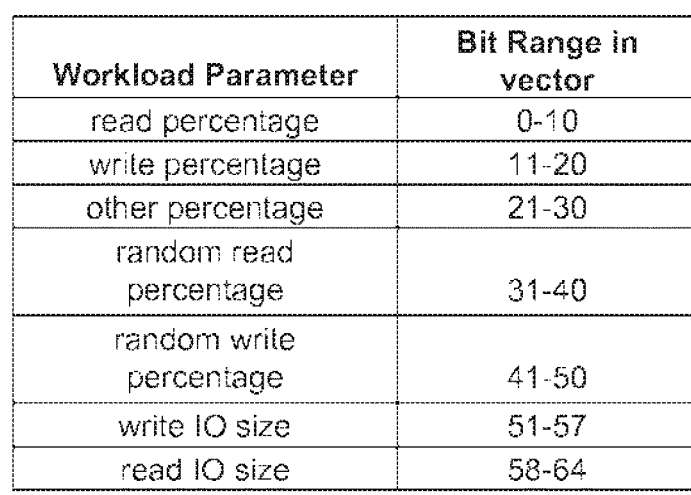

In some embodiments, the workload identifier 113 populates the 64-bit vector of each data sample by determining which bin the sampled values of the seven workload parameters for that given data sample fell into and setting that bit to "1" while leaving the rest at a default "0". FIG. 3A provides an illustrative example of a 64-bit vector of a data sample where bits 0-10 represent read percentage, bits 11-20 represent write percentage, bits 21-30 represent other percentage, bits 31-40 represent random read percentage, bits 41-50 represent random write percentage, bits 51-57 represent write 10 size and bits 58-64 represent read 10 size.

For example, when the workload parameter read percentage has a value of 46% in a data sample, the workload identifier 113 sets bit #5 of the 64-bit vector, which corresponds to the percentage bin 40-50% of the workload parameter read percentage, to "1" and leaves the rest of the 9 bins of read percentage which correspond to other percentages at "0". The workload identifier 113 thus gathers at least 64 workload parameter bins, where the one or more workload parameter bins of the 64 bins that are important for predicting the latency of the DBMS 102 are included in the workload signature of the workload. The additional information provided by these bins in the signature thus not only specify which workload parameters are important for predicting latency but also what range of values those parameters belong to.

In some embodiments, given that the 64-bit vectors and the corresponding bin ranges do not preserve an actual value of the data samples that fall within a given workload parameter bin, the workload identifier 113 computes a membership value for each bin as part of the soft-binning process. In some embodiments, the computed membership value for each workload parameter bin is utilized in later processes such as workload signature matching performed in block 206. In one embodiment, the workload identifier 113 computes membership value for each workload parameter bin using a "Tr" function as shown below in equation (1). In the soft binning process, the workload identifier 113 computes membership value in a particular bin and its surrounding bins with a bell-shaped curve. For example, let a workload parameter have a value of "x" and let it correspond to the bin "k". Let "c" be the center of the bin k and let "w" be the width of the bin. Let "w1" be width of the previous bin i.e., bin "k−1" and "w2" be the width of the bin "k+1". In this instance, the membership value ("van of workload parameter for bins "k−1", "k" and "k+1" are computed as:

$$\text{membership}(x) = \begin{cases} \dfrac{(x-c+w+w_1)^2}{2w_1^2} & \text{For } i = k-1 \\ 1 - \dfrac{(x-c)^2}{2w^2} & \text{for } i = k \\ \dfrac{(x-c-w-w_2)^2}{2w_2^2} & \text{for } i = k+1. =, \\ 0 & \text{otherwise} \end{cases} \quad (1)$$

In block 210, in one embodiment, the workload identifier 113 thus represents each data sample as a vector of length 64, where each entry in the vector is either zero or has a value in [0, 1]. In block 212, the workload parameter bins that the DBMS's 102 response time (i.e. latency) is dependent on is determined by performing a dimensionality reduction of the 64-dimensional space (i.e. the 64 workload parameter bins described above) using classification and regression tree ("CART") modeling as described below.

CART Modeling

In some embodiments, the workload identifier 113 performs CART modeling to identify the workload parameter bins on which the DBMS's 102 response time (i.e. latency) for responding to the service requests from the workload is dependent on. CART modeling is a non-parametric learning technique that produces either classification or regression trees ("regression tree"), depending on whether the dependent variable is categorical or numeric, respectively. CART is constructed in a top-down manner by iteratively partitioning the available data. The regression tree created using the CART modeling (e.g., see FIG. 3B) results in one or more paths from the root node 302 to one or more leaf nodes 310-318. Each path from the root node to the leaf node consists of a set of workload parameter bins (t). In some embodiments, the workload identifier 113 considers the set of workload parameter bins (f,) contained in all paths from the root node to all leaf nodes as the set of important workload parameter bins (t) in predicting the latency of DBMS 102.

Figure 3B:
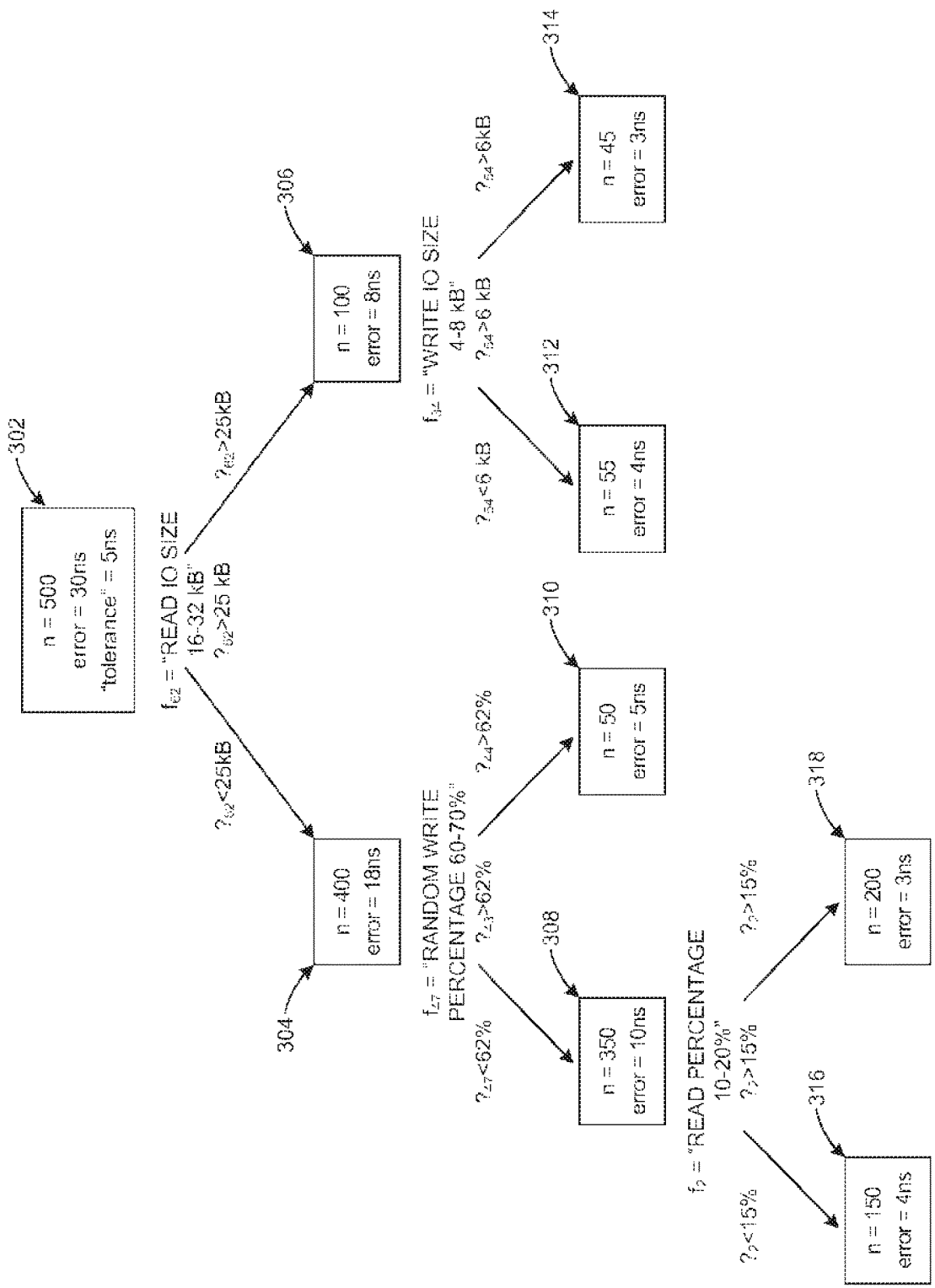
FIG. 3B provides an example of a classification and regression tree ("CART") that can be used to identify significant parameters from the parameters of a workload.

FIG. 3B provide an illustrative example of a regression tree. At the root node 302, all data (i.e., all data samples of the working sample set of 2000) are available as a single group. Applying the CART model, the workload identifier 113 splits the data samples into two sets 304, 306 based on one of the workload parameter bins (say f,), where all data samples with parameter value less than a certain threshold (say, 0) are in one set and the rest are in another set. Thus, two child nodes 304, 306 are created for the root node. For example, if the workload parameter bin used in the root node 302 is "read 10 size 16-32 KB" bin (one of the 64 bins described above), i.e. f62, in one instance, the threshold 062 could be set to "<32 KB". So, for any data sample with $f_{62}<062$, the data sample goes to the left child node 304, while the remaining data samples go to the right child node 306. In some embodiments, the feature f, and threshold 0, are automatically selected by workload identifier 113 such that a certain reduction of error is maximized at each step of the iterative partitioning the available data.

As described above, one of the workload parameter bins (say f,) is used when splitting the data samples in each node 302, 304, 306. The workload parameter bin used at each node 302, 304, 306 is determined based on a parameter bin that results in the best partition of the available data samples at a given node, resulting in increased homogeneity amongst the data samples in each child node. The partition achieved with each workload parameter bin is compared based on a computed reduction in error resulting from each partition. Here, the error is measured with respect to the latency, the metric with respect to which the CART dimensionality reduction is being performed. The error with respect to latency is the sum of squared differences between the sample latencies and the average latency over all samples present at that node (e.g. root mean squared error or RMS error). In one embodiment, the reduction of error is the difference between the error at the parent node 302 and the sum of errors at the child nodes 304, 306.

In one embodiment, at the root node 302 of the regression tree, the workload identifier 113 dynamically adjusts the threshold (0) for a given workload parameter bin (f,) till the best possible reduction of error is achieved for that workload parameter bin (t). The workload identifier 113 repeats the process with other workload parameter bins (f,) while adjusting their respective threshold (0) to achieve the best possible reduction of error for each of the workload parameter bins (t). The workload identifier 113 then chooses one of the workload parameter bins (f,) that yields the most reduction in error.

In some embodiments, the workload identifier 113 repeats the process of partitioning the data and creating two child nodes recursively at each of the child nodes 304, 306 generated in the previous step. In some embodiments, the workload identifier 113 stops the process of recursive partitioning at a node when the ratio of the maximum reduction in the error due to partitioning of the data at that node and the error in that node is less than a certain threshold called the 'tolerance' parameter. In one instance, the 'tolerance' parameter can be user-defined. The regression tree thus created is a tree where each leaf node 310, 312, 314, 316, 318, corresponds to a specific average latency value of the data samples at that leaf node. Further, the path from the root node to the child node consists of a set of workload parameter bins (t) and thresholds (0). In FIG. 3B, the set of workload parameter bins (f,) from the root to each leaf node includes "read 10 size 16-32 KB" bin, "random write percentage 60-70%" bin, "write 10 size 4-8 KB" bin, "read percentage 10-20%" bin. In one embodiment, the workload identifier 113 considers the set of workload parameter bins (f,) contained in all paths from the root nodes to all child nodes as the set of important workload parameter bins (f,) in predicting the latency of DBMS 102.

In block 212, in one embodiment, the workload identifier 113 performs a dimensionality reduction of the 64-dimensional space (i.e. the 64 workload parameter bins described above) using CART modeling to identify the workload parameter bins the DBMS's 102 response time (i.e. latency) is dependent on. In some embodiments, the workload identifier 113 further performs a stabilization process utilizing the soft-binned data samples received from block 210 and the workload parameter bins that were identified by the dimensionality reduction in block 212. In some embodiments, the stabilization process helps the workload identifier 113 identify a new subset of workload parameter bins that the DBMS's 102 response time is dependent on but are also stable (i.e. the identified workload parameter bins are independent of the time when the data samples used to identify the significant workload parameter bins were collected in block 212).

In some embodiments, the workload identifier 113 performs the stabilization process by clustering the plurality of workload parameters into one or more clusters of similar workload parameters that are correlated with each other. Further, the workload identifier 113 chooses a workload parameter from each of a subset of the derived clusters (explained in detail later), where each chosen workload parameter shows the best correlation with the measured average latency of DBMS 102 amongst the parameters included in each of the subset of the derived clusters. In some embodiments, the workload identifier 113 utilizes these chosen workload parameters from each of the subset of the derived clusters as the stabilized workload signature parameter bins.

Stabilization of Workload Signature

To perform stabilization process, in block 214, the various workload parameter bins (i.e. all 64 workload parameter bins) are clustered into a fixed number of clusters, where each cluster includes one or more workload parameter bins that are correlated to each other. In block 216, the clusters which include the significant workload parameter bins identified in block 212 are identified. In block 218, two workload parameter bins (if possible) from each of the clusters (that were identified in block 216) which are best correlated with the latency of the DBMS 102 is gathered as the stabilized workload parameter bins. Here, the stabilized workload parameter bins identified in each cluster with one of the significant workload parameter bins identified in block 212 are stable because of their better correlation with latency than the significant workload parameter bins (i.e. when the stabilized workload parameter bin and the significant workload parameters bin is different in a cluster). Such stabilized workload parameter bins gathered in block 218 are not only correlated with the latency of the DBMS 102 but also stable. In some embodiments, the workload identifier 113 performs the stabilization process.

In some embodiments, the workload identifier 113 clusters the various workload parameter bins (i.e. all 64 workload parameter bins) into a fixed number of clusters using hierarchical clustering algorithm. The workload identifier 113 can use other suitable clustering algorithms such as k-means can be used for the purpose. In one embodiment, the workload identifier 113 clusters all the features into 10 different clusters. Note that the clustering of parameters is completely different from clustering the data samples. Here, the columns are being clustering, i.e., an entire observation of one workload parameter bin over a certain time period is taken as one vector. These vectors are then clustered to obtain clusters of the parameters.

Figure 3C:
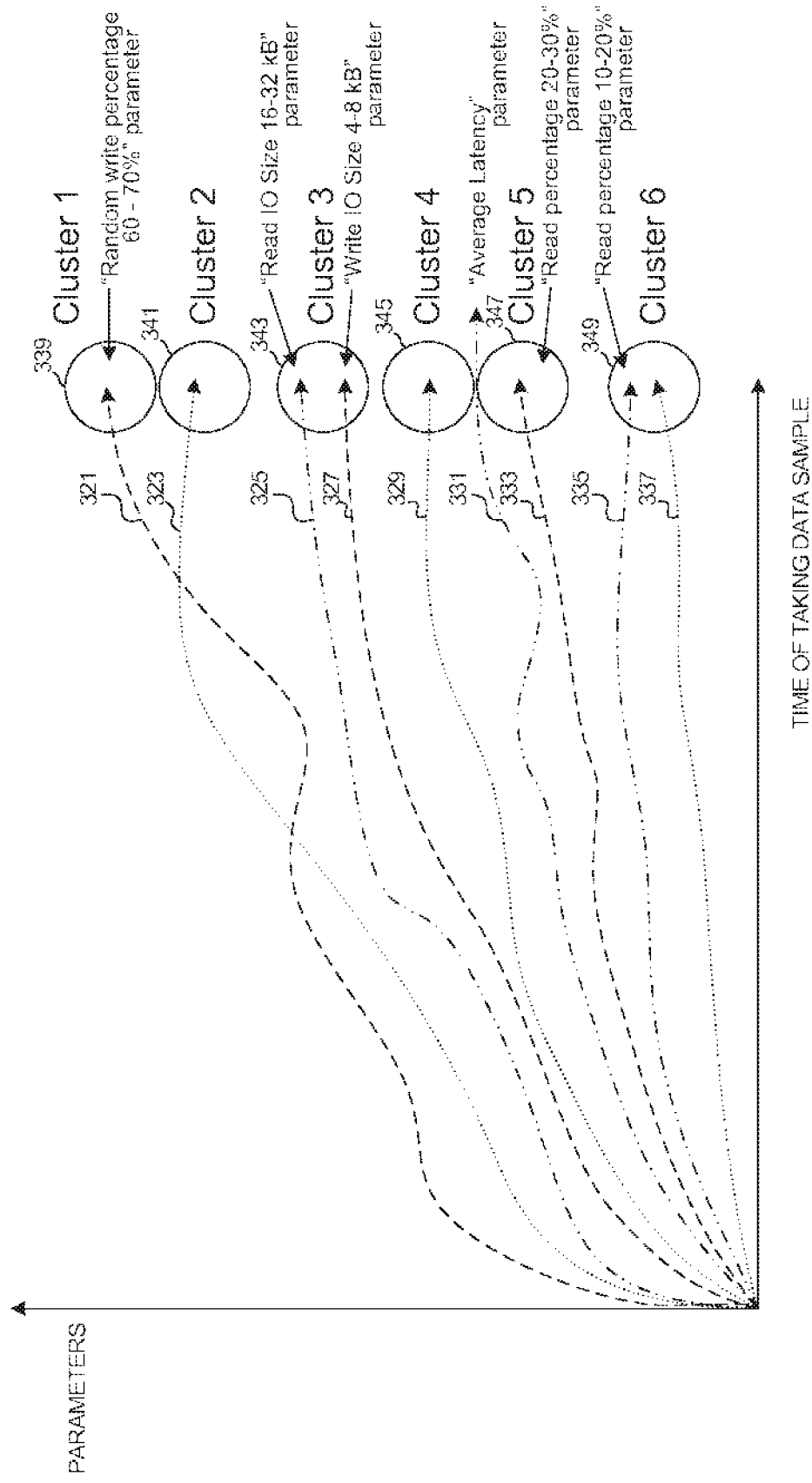
FIG. 3C provides an example of a hierarchical clustering of parameters of a workload.

FIG. 3C provides an illustrative example of various parameters that are clustered using the top-down hierarchical approach. Here, for illustration purposes, only a few of the 64 workload parameter bins are shown. In FIG. 3C, the vectors of workload parameter bins 321-329, 333-337 including parameter average latency 331 are graphed against the time the data samples associated with each vector were taken. The hierarchical clustering process stops when the process produces the predefined number of cluster of parameters. In FIG. 3C, the number of clusters were set at six and the clustering process produced six clusters, clusters #1 339-cluster #6 349.

In some embodiments, the workload identifier 113 then identifies the clusters, derived in block 214, which include the significant workload parameter bins identified in block 212. In FIG. 3C, the various clusters containing the significant workload parameter bins identified in block 214 (illustrated in FIG. 3B) are illustrated. In FIG. 3B, the significant workload parameter bins identified by the CART modeling were "read 10 size 16-32 KB" bin, "random write percentage 60-70%" bin, "write 10 size 4-8 KB" bin, and "read percentage 10-20%" bin. In FIG. 3C, cluster #1 339 contains the parameter "random write percentage 60-70%" bin, cluster 3 contains the parameters "read 10 size 16-32 KB" bin and "write 10 size 4-8 KB" bin, and cluster 6 contains the parameter "read percentage 10-20%" bin.

In some embodiments, for each of the above identified clusters in block 216, the workload identifier 113 then identifies at least one workload parameter bin in each of the respective clusters which has the highest correlation with DBMS's 102 latency 331 (gathered as part of each data sample's general parameters). In one embodiment, the correlation between the various workload parameter bins and the latency can be determined by measuring the Euclidean distance between a function representing each of the workload parameter bins 321-329, 333-337 and the latency 331 parameter, where the workload parameter bin with the least distance is the most correlated with latency 331. In one embodiment, the stabilized workload parameter bins identified in block 218 together could constitute a workload signature of the workload. Thus, by clustering the parameters and identifying the workload parameters with better correlation to the latency 331, the stabilized workload parameter bins are not only significant for predicting the latency of DBMS 102 but also stable.

Utilizing the stabilized workload parameter bins, in block 206 of the method 200, the method includes determining the workload signature of the workload. In one example, the workload identifier 113 determines the workload signature of the workload based on the stabilized workload parameter bins. In some demonstrative embodiments, the workload classifier 113 further determines a classification (i.e. workload type) for the workload by selecting a workload classification from workload classifications 111c based on a comparison between a candidate workload signature and workload signatures 111b, where, for e.g., all the stabilized workload parameter bins identified in block 218 together could constitute a candidate workload signature of the workload. Further, the workload can be classified as a workload classification of classifications 111c corresponding to a workload signature of signatures 111b having the best match with the candidate workload signature. The best match between the candidate workload signature and workload signature templates 111c can be determined using any suitable match recognition method and/or algorithm, for example, a nearest neighbor matching algorithm and/or any other matching algorithm.

Figure 2C:
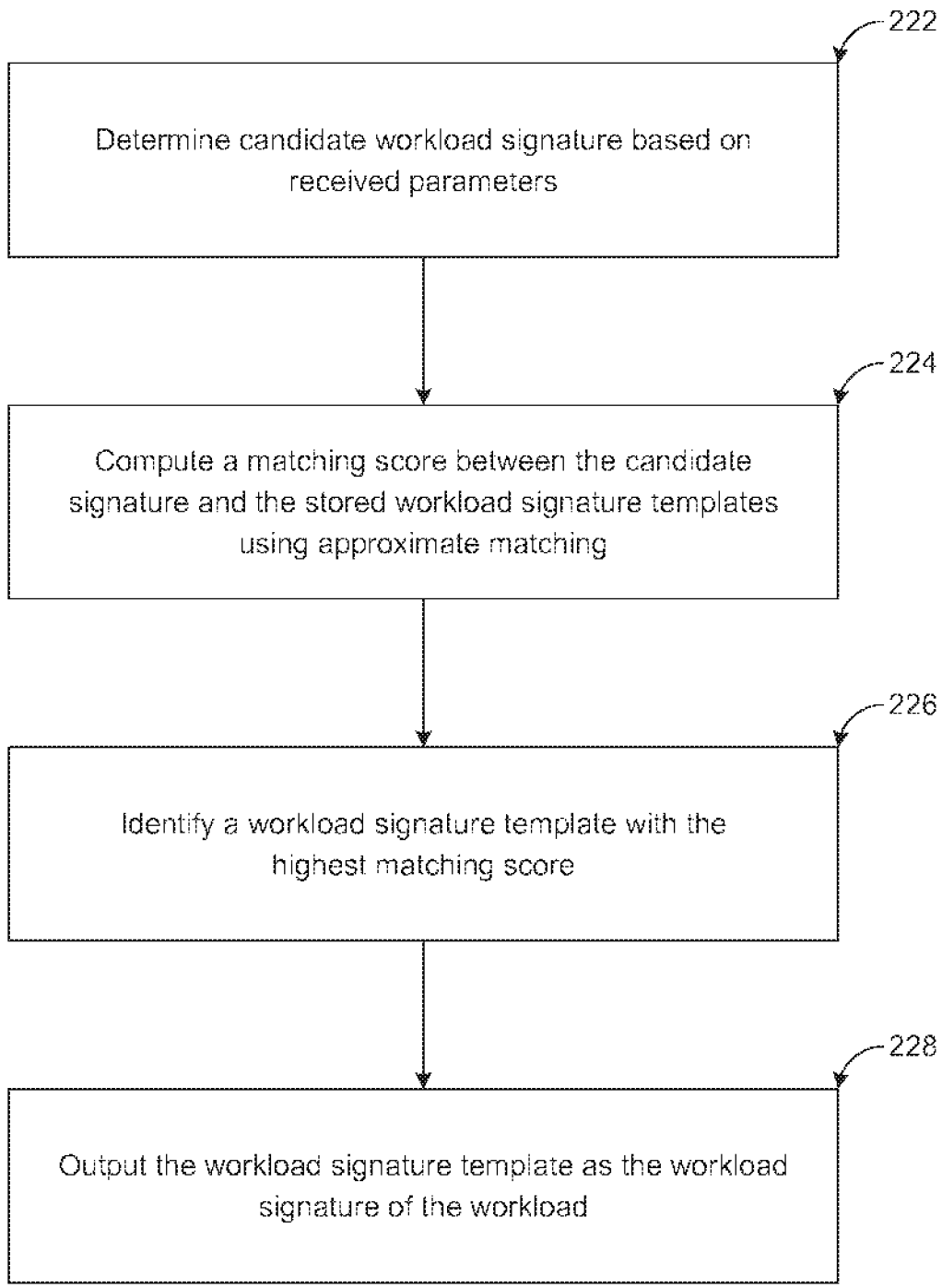
FIG. 2C is a schematic flow-chart illustration of a method of determining a workload signature of a workload.

In some embodiments, the workload identifier 113 determines the workload signature of the workload by utilizing the method disclosed in FIG. 2C. In block 222 of the method disclosed in FIG. 2C, the workload identifier 113 determines a candidate workload signature based on the stabilized workload parameter bins. In some embodiments, all the stabilized workload parameter bins identified in block 218 together could constitute a candidate workload signature of the workload.

Approximate Signature Matching

In block 224 of the method disclosed in FIG. 2C, the workload identifier 113 performs an approximate matching of the candidate workload signature with the various workload signature templates 111b (which are in turn associated with various workload classifications 111c) stored in the workload classifier 104. In some embodiments, the workload identifier 113 matches the candidate workload signature of a workload with the stored workload signature templates 111b utilizing approximate match. In approximate matching, neighboring workload parameter bins are considered when determining a match between the candidate workload signature and the stored workload signature templates 111b.

For example, if stabilized workload parameter bin "read percentage 30-40%" is included in the candidate signature, then finding either "read percentage 40-50%" or "read percentage 20-30%" (i.e. neighborhood bins) in the workload signature templates 111c indicates a possible match between the signatures (i.e. if the rest of the stabilized workload bins are found in the partially matched workload signature template). Approximate matching is possible because from a workload's point of view, a "read percentage 40-50%" bin can have similar type of correlation with the latency of DBMS 102 as "read percentage 30-40%" bin, although it is a neighboring bin in the workload template signature 111b. Approximate matching is also useful as it helps to cut down the number of workload signature templates and any associated pre-trained samples that we need to store for each of the workload signature templates.

In some embodiments, the workload identifier 113 performs approximate matching by computing the influence of each workload parameter bin to its neighboring bins. For example, for each stabilized workload parameter bin in the candidate workload signature "f", there could be about 10 workload parameter bins $f_1, f_2, \ldots, f_{10}$, for the various data ranges (as shown in FIG. 3A). In some embodiments, the workload identifier 113 computes the influence of the neighboring bins j of workload parameter bin a $f_1$, as:

$$val_j^f = \max_i \left\{ f_i \exp\left(\frac{-(i-j)^2}{2\sigma^2}\right) \right\} \quad (2)$$

where, σ is the spread of the influence, f, is the stabilized workload parameter bin, j is the neighboring parameter bins associated with $f_i$). In one embodiment, the value of a was set to a=binSize/6 (as described in detail below). In some embodiments, the workload identifier 113 computes a vector of values $val^f$, for the workload signature, where $$v^S = [val_i^f | I=1,2,\ldots,10; f \in P]$$

where, P is the set of workload parameters. For example, for the seven workload parameters described in FIG. 3A, the $V^S$ for candidate workload signature will have a maximum of 64 neighboring values computed based on function (2).

In some embodiments, the workload identifier 113 performs an approximate match of candidate signature S with a stored workload template signature T (another pre-computed 64 dimensional vector) by computing a matching score for the candidate signature S with each of the stored workload template signature T. In some embodiments, the workload identifier 113 computes a match score using a modified form of Jaccard similarity coefficient using the notion of union and intersection of fuzzy sets. In one embodiment, the modified similarity coefficient could be computed as:

$$\text{match}(S, T) = \frac{\sum_i \min\{v_i^S, v_i^T\}}{\sum_i \max\{v_i^S, v_i^T\}}$$

where, in the case of exact match, the match equation (4) computes the sum of entries that match between signatures S and T while normalizing the sum by the length of the smaller signature. Further, in the case of approximate match, where each workload parameter bin is influenced by the neighboring bins, for each stabilized workload parameter bin, the workload identifier 113 may sum the minimum value of the parameter bins between signatures S and T, before normalizing the minimum total value of the signatures. It should be noted that as a increases, the match score between two signatures increases and vice-versa.

For example, for a very large a, almost all bins will become unity wherever any one bin is present in the signature for that parameter. On other hand, if a is very low, then the required match becomes an exact match. Experimentally, setting a=binSize/6 provides of the best approximation matches. In one embodiment, the workload identifier 113 sets the a=binSize/6 when performing approximation matches. Utilizing the matching scores computed in block 224, the workload identifier 113 can determine the workload signature template 111b that has the corresponding highest matching score and output the identified workload signature template as the workload signature of the workload in block 228. In some embodiments, the workload identifier 113 further determines a workload classification corresponding to the workload signature of the workload as described in detail earlier.

In some embodiments, system 100 and/or a management system (not shown) associated with system 100, allocates resources to workload based on the workload classification, optionally taking into account any additional information in the annotations corresponding to the workload signature. System 100 and/or the management system may implement any suitable resource allocation and/or resource management mechanism, algorithm, and/or method to allocate the resources to workload.

FIG. 4 is a high-level block diagram showing an example of the architecture for a computer system 400 that can be utilized to implement a DBMS (e.g., 102 from FIG. 1), a workload classifier (e.g., 104 from FIG. 1), etc. In FIG. 4, the computer system 400 includes one or more processors 405 and memory 410 connected via an interconnect 425. The interconnect 425 is an abstraction that represents any one or more separate physical buses, point to point connections, or both connected by appropriate bridges, adapters, or controllers. The interconnect 425, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 494 bus, sometimes referred to as "Firewire."

The processor(s) 405 may include central processing units (CPUs) to control the overall operation of, for example, the host computer. In certain embodiments, the processor(s) 405 accomplish this by executing software or firmware stored in memory 410. The processor(s) 405 may be, or may include, one or more programmable general-purpose or special-purpose microprocessors, digital signal processors (DSPs), programmable controllers, application-specific integrated circuits (ASICs), programmable logic devices (PLDs), or the like, or a combination of such devices.

The memory 410 is or includes the main memory of the computer system 400. The memory 410 represents any form of random access memory (RAM), read-only memory (ROM), flash memory, or the like, or a combination of such devices. In use, the memory 410 may contain, among other things, an operating system 430 and a set of machine instructions which, when executed by processor 405, causes the processor 405 to perform operations to implement embodiments of the present invention.

Also connected to the processor(s) 405 through the interconnect 425 is a network adapter 415. The network adapter 415 provides the computer system 400 with the ability to communicate with remote devices, such as the storage clients, and/or other storage servers, and may be, for example, an Ethernet adapter or Fiber Channel adapter.

It is also within the scope of an embodiment of the technique introduced here to implement a program or code that can be stored in a machine-readable storage medium to permit a computer to perform any of the methods described above. The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method comprising:
   partitioning, by a computing device, parent data sample set into a plurality of child data sample sets based on one or more policies associated with a selected one of the plurality of workload parameters associated with the parent data sample set based on application of one or more modeling techniques;
   determining, by the computing device, a reduction in error associated with each of the child data sample sets; and
   recursively partitioning, by the computing device, each of the child data sample sets into a plurality of additional child data sample sets until the determined reduction in error associated with each of the child data sample sets and an error due to the recursively partitioning of each of the child data sample sets is less than their corresponding stored tolerance parameter, wherein the recursively partitioning further comprises adjusting a selected one of the workload parameters associated with each of the child data sample sets to reduce an error associated with each of the child data sample sets and adjust for an optimized reduction of error for the selected one of the workload parameters by: dynamically adjusting the tolerance parameter for the selected one of the workload parameters, comparing the reduction of errors from adjusting the tolerance parameter for the selected one of the workload parameters, and selecting the smallest one of the reduction of error for the selected one of the workload parameters.

2. The method of claim 1, wherein the parent data sample set comprises a plurality of workload parameter bins and wherein the workload parameters comprise a read operation or a write operation.

3. The method of claim 1, further comprising:
   determining latency errors associated with the parent data sample set, each of the child data sample sets and the additional child data sample sets.

4. The method of claim 3, wherein the determined reduction in error is a difference between the determined latency error at the parent data sample set and the sum of the determined latency errors at the child data sample sets.

5. The method of claim 1, wherein the one or more polices comprises a threshold read operation size or a threshold write operation size and wherein the one or more modeling techniques comprises classification and regression tree (CART) modeling.

6. A non-transitory machine readable medium having stored thereon instructions for creating a top down flow for a data sample set comprising machine executable code which when executed by at least one machine, causes the machine to:
   partition parent data sample set into a plurality of child data sample sets based on one or more policies associated with a selected one of the plurality of workload parameters associated with the parent data sample set based on application of one or more modeling techniques;
   determine a reduction in error associated with each of the child data sample sets; and
   recursively partition each of the child data sample sets into a plurality of additional child data sample sets until the determined reduction in error associated with each of the child data sample sets and an error due to the recursively partitioning of each of the child data sample sets is less than their corresponding stored tolerance parameter, wherein the recursively partitioning further comprises adjusting a selected one of the workload parameters associated with each of the he child data sample sets to reduce an error associated with each of the child data sample sets and adjust for an optimized reduction of error for the selected one of the workload parameters by: dynamically adjusting the tolerance parameter for the selected one of the workload parameters, comparing the reduction of errors from adjusting the tolerance parameter for the selected one of the workload parameters, and selecting the smallest one of the reduction of error for the selected one of the workload parameters.

7. The non-transitory machine readable medium of claim 6, wherein the parent data sample set comprises a plurality of workload parameter bins and wherein the workload parameters comprise a read operation or a write operation.

8. The non-transitory machine readable medium of claim 6, further comprising the machine executable code which when executed by at least one machine, causes the machine to:
   determine latency errors associated with the parent data sample set, each of the child data sample sets and the additional child data sample sets.

9. The non-transitory machine readable medium of claim 8, wherein the determined reduction in error is a difference between the determined latency error at the parent data sample set and the sum of the determined latency errors at the child data sample sets.

10. The non-transitory machine readable medium of claim 6, wherein the one or more polices comprises a threshold read operation size or a threshold write operation size and wherein the one or more modeling techniques comprises classification and regression tree (CART) modeling.

11. A computing device comprising:
   a memory containing a machine readable medium comprising machine executable code having stored thereon instructions for performing a method of creating a top down flow for a data sample set; and
   a processor coupled to the memory, the processor configured to execute the machine executable code to cause the processor to:
      partition parent data sample set into a plurality of child data sample sets based on one or more policies associated with a selected one of the plurality of workload parameters associated with the parent data sample set based on application of one or more modeling techniques;
      determine a reduction in error associated with each of the child data sample sets; and
      recursively partition each of the child data sample sets into a plurality of additional child data sample sets until the determined reduction in error associated with each of the child data sample sets and an error due to the recursively partitioning of each of the child data sample sets is less than their corresponding stored tolerance parameter, wherein the recursively partitioning further comprises adjusting a selected one of the workload parameters associated with each of the he child data sample sets to reduce an error associated with each of the child data sample sets and adjust for an optimized reduction of error for the selected one of the workload parameters by: dynamically adjusting the tolerance parameter for the selected one of the workload parameters, comparing the reduction of errors from adjusting the tolerance parameter for the selected one of the workload parameters, and selecting the smallest one of the reduction of error for the selected one of the workload parameters.

12. The device of claim 11, wherein the parent data sample set comprises a plurality of workload parameter bins and wherein the workload parameters comprise a read operation or a write operation.

13. The device of claim 11, further comprising a processor coupled to the memory, the processor configured to execute the machine executable code to cause the processor to: determine latency errors associated with the parent data sample set, each of the child data sample sets and the additional child data sample sets.

14. The device of claim 13, wherein the determined reduction in error is a difference between the determined latency error at the parent data sample set and the sum of the determined latency errors at the child data sample sets.

15. The device of claim 11, wherein the one or more polices comprises a threshold read operation size or a threshold write operation size and wherein the one or more modeling techniques comprises classification and regression tree (CART) modeling.

16. The device as set forth in claim 11 wherein the reduction in error is determined based on a latency parameter.

17. The device as set forth in claim 11 wherein recursively partitioning each of the child data sample sets into a plurality of additional child data sample sets results in the reduction of error associated with each of the plurality of child data sample sets.

* * * * *